US009937839B2

(12) United States Patent
Nahman et al.

(10) Patent No.: US 9,937,839 B2
(45) Date of Patent: Apr. 10, 2018

(54) FEEDBACK BY MODIFYING STIFFNESS

(71) Applicant: HARMAN INTERNATIONAL INDUSTRIES, INC., Stamford, CT (US)

(72) Inventors: Jaime Elliot Nahman, Oakland, CA (US); Stefan Marti, Oakland, CA (US); Davide Di Censo, Oakland, CA (US); Mirjana Spasojevic, Palo Alto, CA (US)

(73) Assignee: HARMAN INTERNATIONAL INDUSTRIES, INCORPORATED, Stamford, CT (US)

(*) Notice: Subject to any disclaimer, the term of this patent is extended or adjusted under 35 U.S.C. 154(b) by 89 days.

(21) Appl. No.: 14/857,548

(22) Filed: Sep. 17, 2015

(65) Prior Publication Data
US 2016/0185267 A1 Jun. 30, 2016

Related U.S. Application Data
(60) Provisional application No. 62/098,972, filed on Dec. 31, 2014.

(51) Int. Cl.
B60N 2/72 (2006.01)
B60N 2/46 (2006.01)
(Continued)

(52) U.S. Cl.
CPC ............. B60N 2/72 (2013.01); B60K 35/00 (2013.01); B60K 37/06 (2013.01); B60N 2/4626 (2013.01);
(Continued)

(58) Field of Classification Search
CPC .......... G06F 2203/014; G06F 3/04842; G06F 2203/04809; G06F 3/016; G06F 3/0488;
(Continued)

(56) References Cited

U.S. PATENT DOCUMENTS 7,858,891 B2 * 12/2010 Strohband ............. H01H 13/84
200/406
8,260,482 B1 * 9/2012 Szybalski ............. B62D 1/286
701/23

(Continued)

FOREIGN PATENT DOCUMENTS

WO 0118617 A1 3/2001
WO 2013098492 A1 7/2013

OTHER PUBLICATIONS

Follmer, et al. "Jamming User Interfaces: Programmable Particle Stiffness and Sensing for Malleable and Shape-Changing Devices" UIST'12, Oct. 7-10, 2012, Cambridge, Massachusetts, USA. Copyright 2012 ACM978-1-4503-1580-7/12/10. (http://tmg-trackr.media.mit.edu:8020/SuperContainer/RawData/Papers/484-Jamming%20User%20Interfaces%20Programmable/Published/PDF).

(Continued)

Primary Examiner — Jason Holloway
(74) Attorney, Agent, or Firm — Artegis Law Group, LLP

(57) ABSTRACT

A system for modifying a stiffness of at least a portion of a vehicle component includes one or more devices coupled to the vehicle component and a processor coupled to the one or more devices. The processor is configured to determine that a software application has switched from a first mode to a second mode and cause the one or more devices to modify the stiffness of the at least a portion of the vehicle component from a first stiffness associated with the first mode to a second stiffness associated with the second mode.

20 Claims, 14 Drawing Sheets

(51) Int. Cl.
*B60K 35/00* (2006.01)
*B60K 37/06* (2006.01)
*G06F 3/0488* (2013.01)
*G06F 3/01* (2006.01)
*G06F 3/0484* (2013.01)

(52) U.S. Cl.
CPC ............ *G06F 3/016* (2013.01); *G06F 3/0488* (2013.01); *G06F 3/04842* (2013.01); *G06F 2203/014* (2013.01)

(58) Field of Classification Search
CPC ............ B62D 1/046; B60K 2350/1024; B60K 2350/928; B60K 37/06; B60K 35/00; B60K 2350/1016; D03D 1/0088; B60N 2/72; B60N 2/4626
See application file for complete search history.

(56) References Cited

U.S. PATENT DOCUMENTS

| | | | |
|---|---|---|---|
| 8,400,410 B2 | 3/2013 | Taylor et al. | |
| 8,717,151 B2 | 5/2014 | Forutanpour et al. | |
| 9,213,409 B2* | 12/2015 | Redelsheimer | G06F 3/016 |
| 2007/0247420 A1* | 10/2007 | Strohband | H01H 13/84 345/156 |
| 2008/0111788 A1* | 5/2008 | Rosenberg | A63F 13/06 345/156 |
| 2010/0156818 A1* | 6/2010 | Burrough | G06F 3/016 345/173 |
| 2011/0246028 A1* | 10/2011 | Lisseman | B60K 28/066 701/45 |
| 2011/0304550 A1* | 12/2011 | Romera Jolliff | G06F 3/016 345/168 |
| 2012/0105333 A1* | 5/2012 | Maschmeyer | G06F 3/016 345/173 |
| 2012/0296528 A1* | 11/2012 | Wellhoefer | B62D 1/046 701/48 |
| 2014/0317522 A1 | 10/2014 | Lucero et al. | |
| 2015/0015382 A1* | 1/2015 | Aubry | G05G 5/03 340/407.1 |
| 2015/0294656 A1* | 10/2015 | Hanuschak | G06F 3/167 84/453 |
| 2016/0124510 A1* | 5/2016 | Hyde | G06F 3/016 340/407.2 |

OTHER PUBLICATIONS

Tactus Technology White Paper "Taking Touch Screen Interfaces Into a New Dimension" Copyright © 2012 Tactus Technology, Inc. (http://tactustechnology.com/wp-content/uploads/2013/09/Tactus_Technology_White_Paper.pdf).
Raffle, et al. "Super Cilia Skin: An Interactive Membrane" CHI 2003, Apr. 5-10, 2003, Ft. Lauderdale, Florida, USA. ACM 1-58113-630-07/03/0004. (http://www.hayesraffle.com/projects/super-cilia-skin).
Bau, et al. "TeslaTouch: Electrovibration for Touch Surfaces" UIST'10, Oct. 3-6, 2010, New York, New York, USA. Copyright 2010 ACM 978-1-4503-0271-5/10/10(http://www.disneyresearch.com/project/teslatouch/).
Coxworth, Ben "Magnetic microhair material can change transparency, and make water flow uphill" NewAtlas.com Aug. 8, 2014. (http://newatlas.com/magnetic-microhair-material/33291/).
Biet, M., Giraud, F. and Lemaire-Semail, B. (2008) 'Implementation of tactile feedback by modifying the perceived friction', The European Physical Journal—Applied Physics, 43(1), pp. 123-135. (http://journals.cambridge.org/action/displayAbstract?fromPage=online&aid=8023980).
Iliaifar, Amir "Magna Intelligent Surface Technology: Like Controlling Your Car with an iPhone" DigitalTrends.com, May 17, 2012. (http://www.digitaltrends.com/cars/magna-intelligent-surface-technology-like-controlling-your-car-with-an-iphone/).
Pflug, Enno, Continental Press Portal "Study: Next Generation Touchpad with Haptic Feedback Makes Control Tasks Easier and Safer" Nov. 8, 2013 (http://www.continental-corporation.com/www/servlet/pdf/9280786/or_2013_11_08_touchpad_en.pdf).
Yoo, et al. "PneUI: Pneumatically Actuated Soft Composite Materials for Shape Changing Interfaces" UIST'13, Oct. 8-11, 2013, St. Andrews, United Kingdom. Copyright © 2013 ACM 978-1-4503-2268-3/13/10. (http://tmg-trackr.media.mit.edu/publishedmedia/Papers/528-PneUI%20Pneumatically%20Actuated%20Soft/Published/PDF).
Extended European Search Report Application No. 15202881.7, dated May 17, 2016, 7 pages.
Non-Final Office Action for U.S. Appl. No. 14/815,766 dated Dec. 2, 2016.
Wikipedia Article, Actuator, printed Nov. 2016.
Stanley et al., "Controllable Surface Haptics via Particle Jamming and Pneumatics," IEEE Transactions, 2014.

* cited by examiner

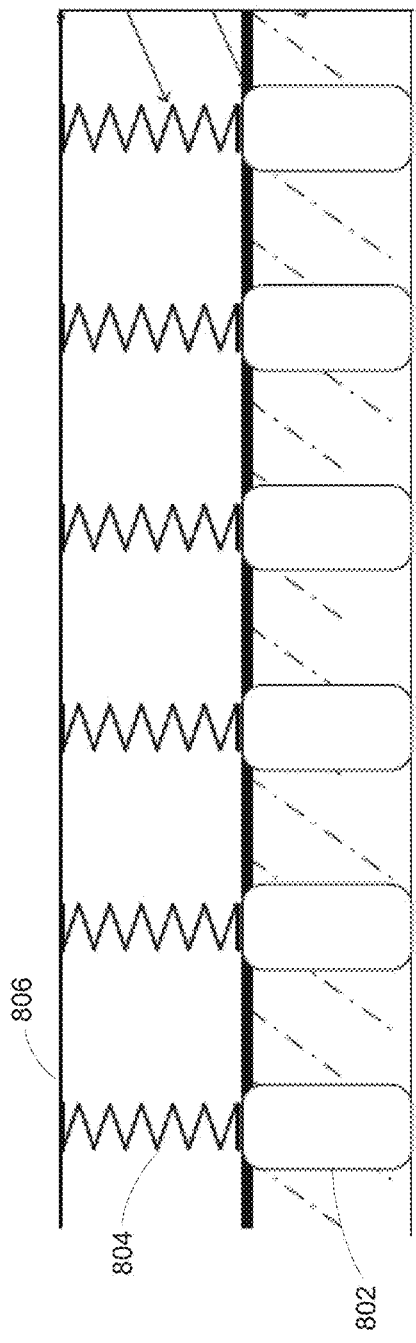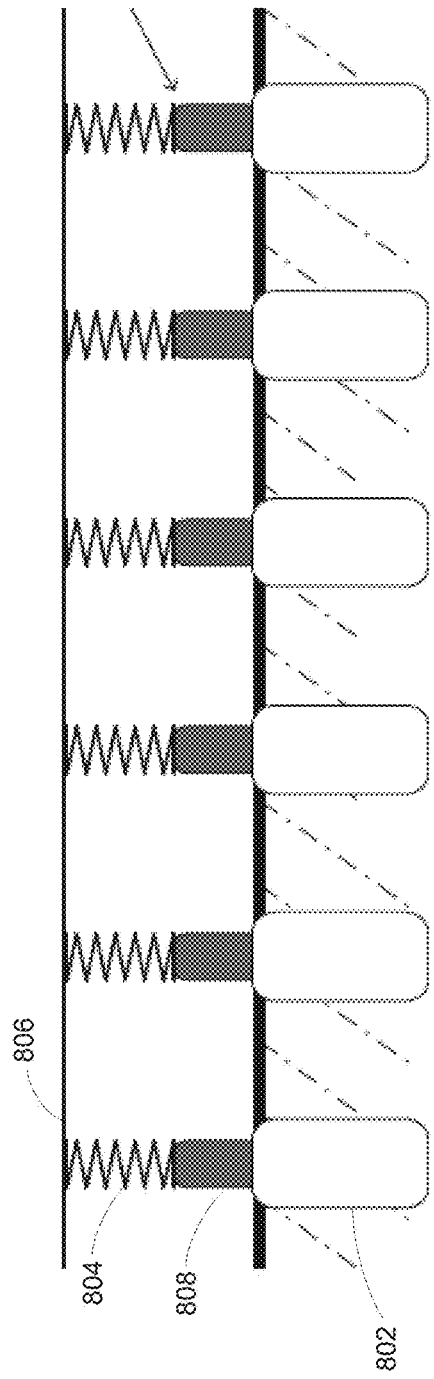
FIG. 8A
FIG. 8B

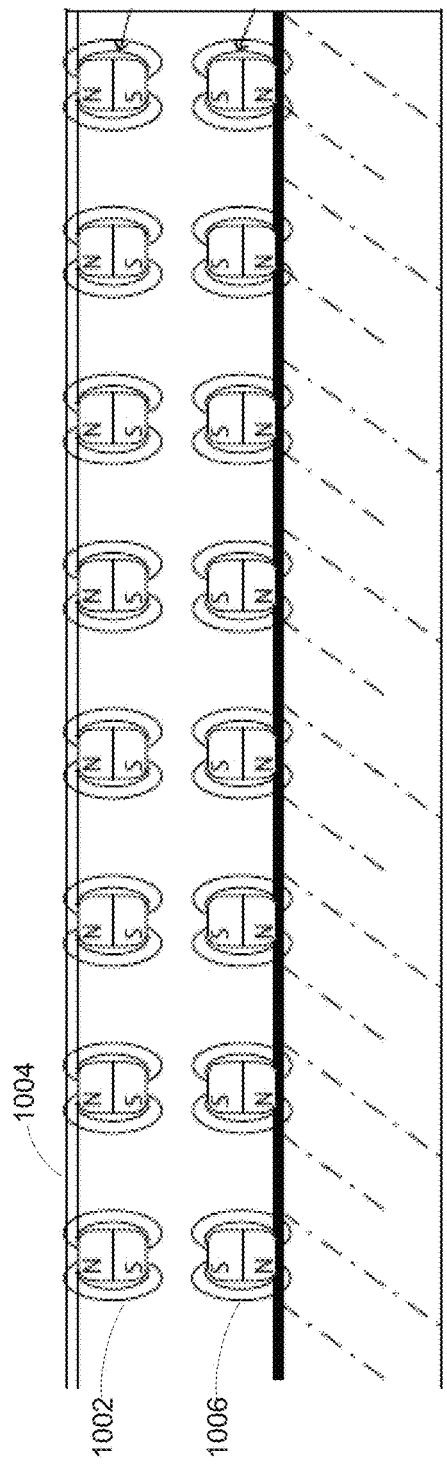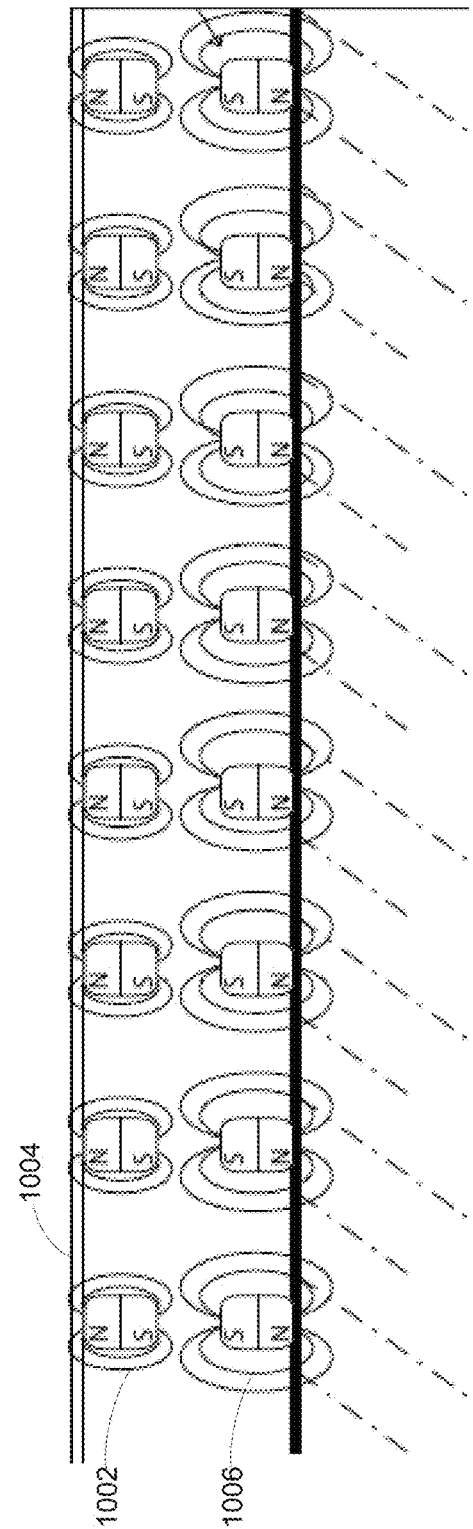

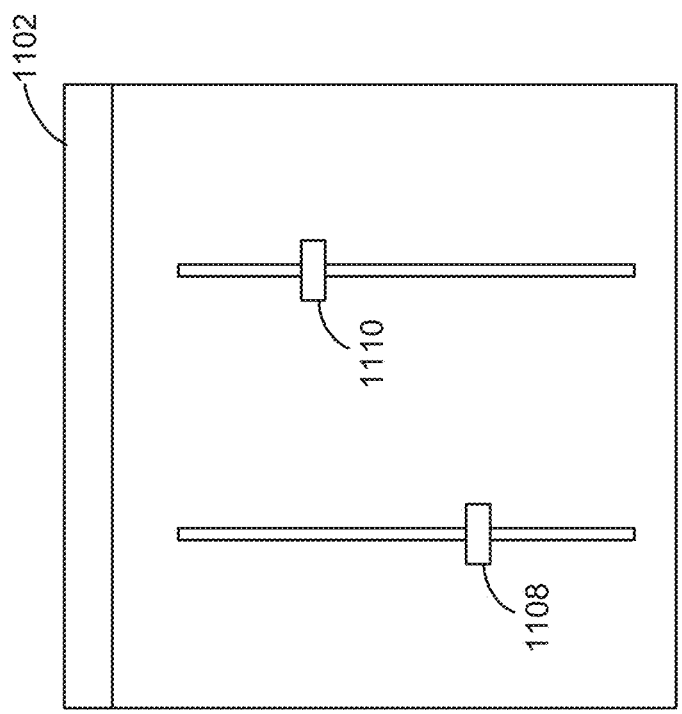
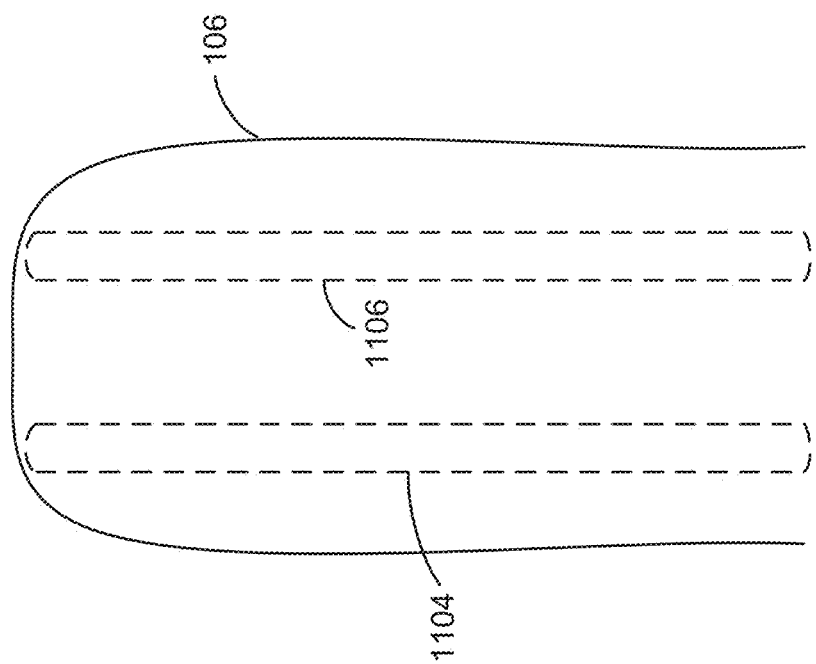
FIG. 11

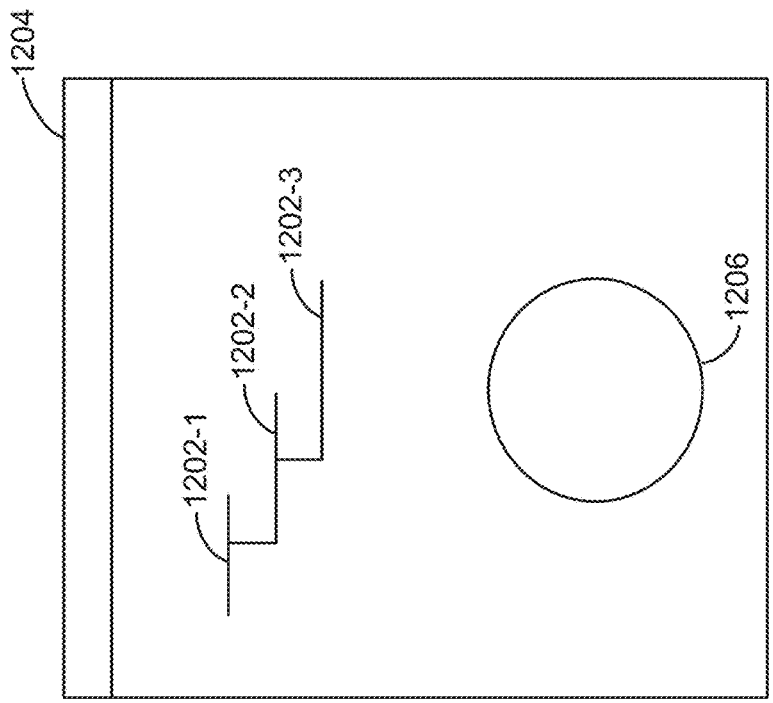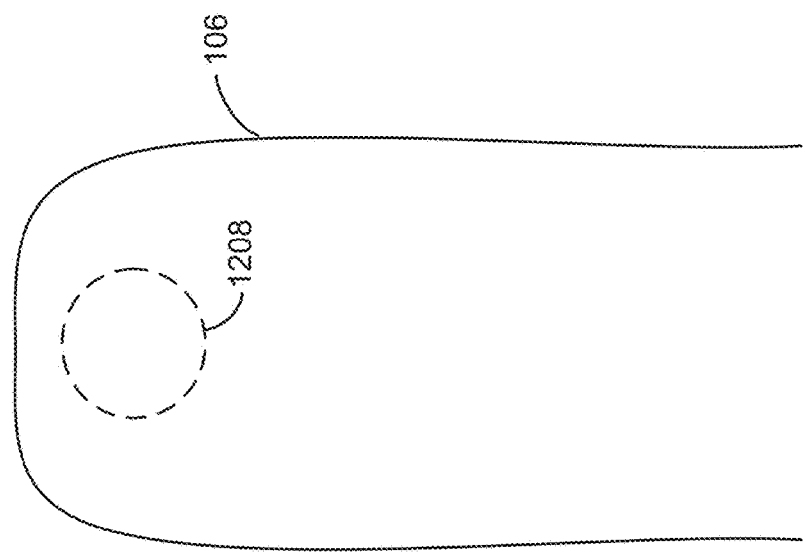
FIG. 12

FEEDBACK BY MODIFYING STIFFNESS

CROSS-REFERENCE TO RELATED APPLICATIONS

This application claims priority to U.S. provisional patent application titled, "HAPTIC CONTROLLER WITH DYNAMICALLY CHANGING STIFFNESS," filed on Dec. 31, 2014 and having Ser. No. 62/098,972. The subject matter of this related application is hereby incorporated herein by reference.

BACKGROUND

Field of the Embodiments

The various embodiments relate generally to vehicle control systems and, more specifically, to providing feedback by modifying stiffness.

Description of the Related Art

User interfaces provide a mechanism for humans to interact with machines and computer-based systems. Vehicle control systems, such as in-vehicle infotainment (IVI) systems, include user interfaces that allow a driver or passenger to operate and control various functions of the vehicle, such as adjusting the volume of a sound system, accepting an incoming cellular phone call, entering a destination address into a navigation system, and playing a media file. Touch screens, buttons, knobs, and other devices may be used to operate and control the functions of a vehicle control system. Vehicle control systems also may provide functionality associated with vehicle components or movement of the vehicle, such as steering, increasing speed, decreasing speed, and braking.

Depending on the mode of a vehicle control system, a particular type of input may cause different operations to occur. For example, and without limitation, a swipe-right gesture on a touch screen while the system is in a music playback mode may cause the next song to be played. On the other hand, inputting the same swipe-right gesture while the IVI system is in a navigation mode may cause the screen to pan a map down. Furthermore, the navigation mode may accept additional types of input gestures, such as swiping sideways to pan the map left or right. To assist a user in operating the IVI system, the touch screen may indicate whether the IVI system is in the navigation mode or the music playback mode and which input gestures can be performed.

Despite the availability of different devices for operating vehicle control systems, various issues can affect a driver's ability to pay sufficient attention to the road while operating a vehicle control system. For example, and without limitation, before providing input to a vehicle control system, a driver may need to look away from the road and towards a screen in order to determine the mode of the vehicle control system. Additionally, the driver may have to look at the screen to determine which input gestures can be performed in a particular mode. A particular mode of the vehicle control system may accept forward-swiping gestures as input, whereas another mode may not. By looking at the screen, the driver is unable to effectively pay attention to the road, increasing the likelihood that the driver will collide with an object in the surrounding environment.

As the foregoing illustrates, more effective techniques for interacting with a vehicle control system would be useful.

SUMMARY

One or more embodiments set forth include a system for modifying the stiffness of at least a portion of a vehicle component. The system includes one or more devices coupled to the vehicle component and a processor coupled to the one or more devices. The processor is configured to determine that a software application has switched from a first mode to a second mode and cause the one or more devices to modify the stiffness of the vehicle component from a first stiffness associated with the first mode to a second stiffness associated with the second mode.

Further embodiments provide, among other things, a method and a computer-readable storage medium to implement various aspects of the system set forth above.

Advantageously, the disclosed techniques enable a user to operate a vehicle control system without requiring the user to look at a user interface, such as a screen. Thus, the disclosed techniques, among other things, increase the ability of a user to pay attention to driving conditions while safely and efficiently operating a vehicle control system.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIGS. 8A and 8B illustrate a technique for modifying the stiffness of the armrest of FIG. 1 by compressing springs, according to various embodiments;

FIGS. 10A and 10B illustrate a technique for modifying the stiffness of the armrest of FIG. 1 via electromagnets, according to various embodiments;

FIG. 11 illustrates a top view of portions of the armrest of FIG. 1 that correspond to slider elements of a graphical user interface, according to various embodiments;

FIG. 12 illustrates a top view of a portion of the armrest of FIG. 1 that corresponds to a menu of a graphical user interface and a circular element of the graphical user interface, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Figure 1:
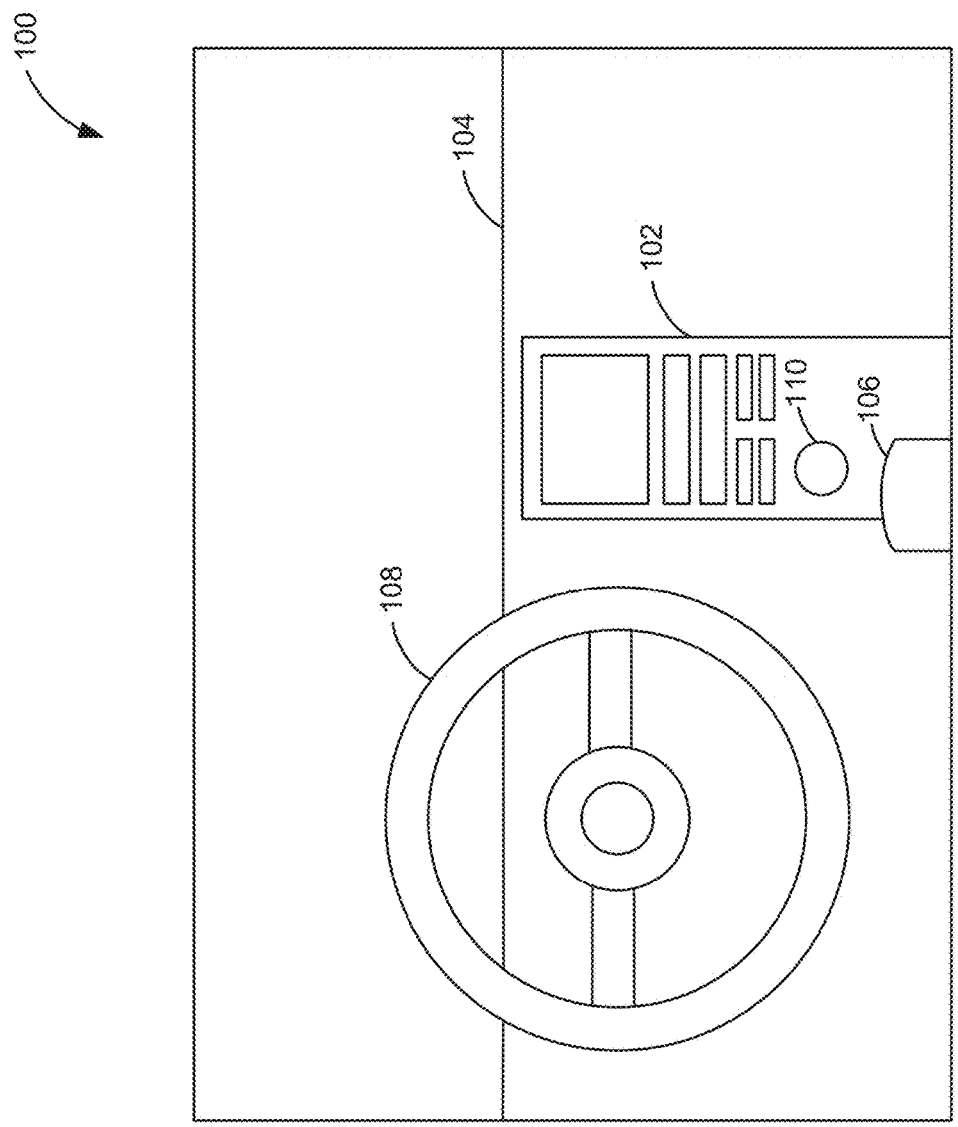
FIG. 1 illustrates a passenger compartment of a vehicle in which a vehicle control system may be implemented, according to various embodiments.

FIG. 1 illustrates a passenger compartment 100 of a vehicle in which a vehicle control system 102 may be implemented, according to various embodiments. As shown, the passenger compartment 100 includes the vehicle control system 102 positioned near a dashboard 104 that provides various instrumentation for a driver of a vehicle. In the non-limiting example embodiment, the vehicle control system 102 includes an armrest 106, a steering wheel 108, and a knob 110. In various embodiments, the stiffness of one or more portions of the armrest 106, the steering wheel 108, and/or the knob 110 is modified to correspond to a mode of the vehicle control system 102 or to provide an indication of a type of input or input gesture that can be used. In some embodiments, the vehicle control system 102 is configured to modify the stiffness in one or more portions.

In various embodiments, the stiffness of the armrest 106, the steering wheel 108, and/or the knob 110 is adjusted based on the mode of the vehicle control system 102. In some embodiments, a mode of the vehicle control system 102 may correspond to a particular application executing on a computing device of the vehicle control system 102. For example, and without limitation, a first mode of the vehicle control system 102 may be associated with execution of a first application that provides a first set of functions (e.g., navigation functions) and a second mode of the vehicle control system 102 may be associated with execution of a second application that provides a second set of functions (e.g., cellular phone functions). Moreover, in various embodiments, the stiffness of the armrest 106, the steering wheel 108, and/or the knob 110 may correspond to one or more parameters that can be adjusted. Consequently, by touching the armrest 106, the steering wheel 108, and/or the knob 110, a driver can determine the mode and what parameters are being controlled without needing to look away from the road.

In operation, the vehicle control system 102 receives input and provides information (e.g., navigation instructions) to a user, such as a driver or passenger. For example, and without limitation, the vehicle control system 102 could receive input from the armrest 106, the steering wheel 108, the knob 110 and/or other input device including a destination, a request for road information or vehicle information, and a request for navigation instructions. In yet other embodiments, the vehicle control system 102 is configured to display controls to the user for controlling functions of various devices within the vehicle. Such functions may include, without limitation, audio functions, video functions, internet functions, climate control functions, cellular phone functions, steering functions, acceleration functions, braking functions, lighting functions, window functions, door locking and unlocking functions, and the like.

Although the vehicle control system 102 is illustrated as being embedded in the center of the dashboard 102, the vehicle control system 102 may alternatively be located in any other technically feasible region of the passenger compartment 100, other portions of the vehicle, and/or may include a standalone module.

Figure 2:
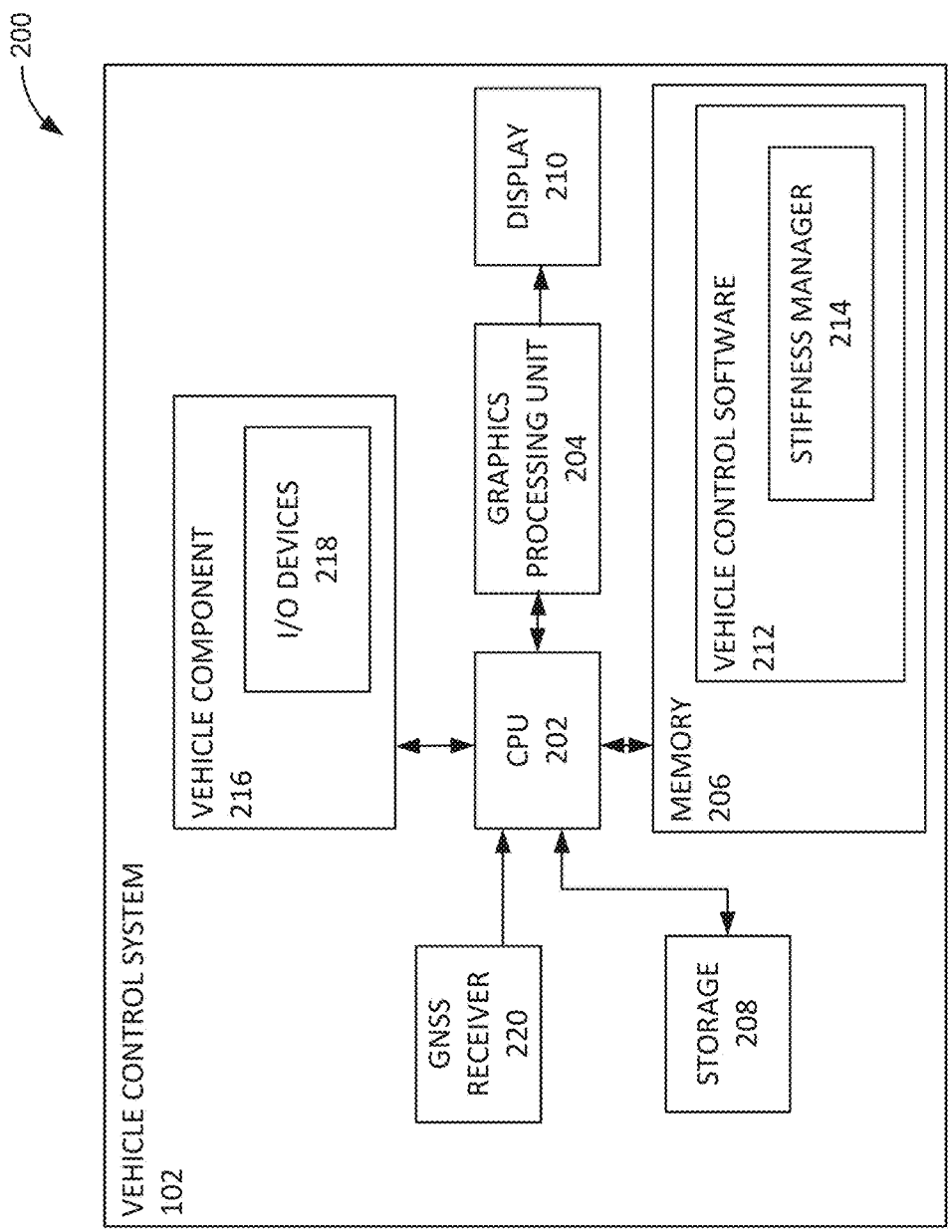
FIG. 2 is a block diagram of the vehicle control system of FIG. 1, according to various embodiments.

FIG. 2 is a block diagram 200 of the vehicle control system 102 of FIG. 1, according to various embodiments. As shown, the vehicle control system 102 includes a central processing unit (CPU) 202, a graphics processing unit (GPU) 204, memory 206, storage 208, and a display 210.

The CPU 202 generally comprises a programmable processor that executes program instructions to manipulate input data. The CPU 202 may include any number of processing cores, memories, and other modules for facilitating program execution. The memory 206 generally comprises one or more memory modules, such as a random access memory (RAM) module, that store applications and data for processing by the CPU 202. For example, and without limitation, the memory 206 includes vehicle control software 212. The vehicle control software 212 may provide information associated with a mode of the vehicle control system 102 and infotainment-related information such as navigation and multimedia information. In some embodiments, the vehicle control software 212 controls different devices associated with the vehicle control system 102.

As shown, the vehicle control software 212 includes a stiffness manager 214 for providing functionality associated with a vehicle component 216. The vehicle component 216 may include the armrest 106, the steering wheel 108, the knob 110, or any other component of the vehicle in which the stiffness of one or more portions may be modified. The stiffness manager 214 is configured to receive input signals from and/or transmit output signals to one or more I/O devices 218 included in the vehicle component 216, the display 210, and various other devices of the vehicle control system 102. The I/O devices 218 may include any type of device capable of processing input and/or generating output.

In a non-limiting example embodiment, the stiffness manager 214 modifies the stiffness of a portion of the right side of the steering wheel 108 to instruct the driver to make a right turn and modifies the stiffness of a portion of the left side of the steering wheel 108 to instruct the driver to make a left turn. In the case of a right turn, the stiffness manager 214 may also modify the stiffness of a portion of the left side of the steering wheel 108 and, in the case of a left turn, the stiffness manager 214 may also modify the stiffness of a portion of the right side of the steering wheel 108. For example, and without limitation, to indicate a right turn, the stiffness manager 214 may modify the right portion to be more stiff and the left portion to be less stiff, or vice versa. In some embodiments, the stiffness manager 214 modifies the stiffness of portions of the steering wheel 108 gradually, over a period of time. For example, and without limitation, the stiffness may be modified by a larger amount as the vehicle come closer to a turn. Moreover, the difference between the stiffness of the left and right portions of the steering wheel 108 may be based on the degree of curvature of an upcoming turn or curve of the road. For example, and without limitation, a larger change in stiffness may indicate to the driver that the vehicle is approaching a sharper turn or curve.

In other embodiments, the stiffness manager 214 may modify multiple portions of the left and right sides of the steering wheel 108. The number of portions modified may correspond to features of the road. For example, and without limitation, the stiffness manager 214 may modify the stiffness of one portion of the right side of the steering wheel 108 to indicate the vehicle is approaching a gradual turn. The stiffness manager 214 may modify the stiffness of two portions of the right side to indicate a sharper turn and three portions to indicate an even sharper turn. Similar methods may be applied to the left side of the steering wheel for left turns.

Further, in some embodiments, the stiffness manager 214 may modify the stiffness of one or more portions of a rotary controller, such as the knob 110. For example, and without limitation, the stiffness of the top portion of the knob 110 may be modified. In another embodiment, the stiffness of the gripping area around the circumference may be modified. Moreover, modes may be associated with stiffness of the knob 110, similar to the different modes described for the armrest 106.

In some embodiments, the I/O devices 218 may include one or more sensors for detecting touch input received from a user and for sending input signals associated with the touch input to the stiffness manager 214. For example, and without limitation, the sensor(s) may include pressure sensors, capacitive sensors, temperature sensors, and/or other suitable sensors for detecting touch input. In some embodiments, I/O devices 218 may include one or more moveable devices configured to modify the stiffness of one or more portions of the vehicle component 216 in response to receiving output signals generated via the stiffness manager 214, as described in further detail below. For example, and without limitation, the one or more moveable devices may include actuators, pistons, springs, electromagnets, solenoids, servos, inflatable bladders, particle jammers, shape memory alloys, shape memory polymers, thermoplastics, dielectric electoreactive polymers, and any other suitable devices and materials for modifying the stiffness of one or more portions of the vehicle component 216.

The GPU 204 generally comprises a programmable or fixed function processor that accepts commands and data from the CPU 202 and generates pixels for display on the display 210. In addition to the I/O devices 218, the vehicle control system 102 may include various devices in other locations that are capable of processing input and/or output, such as buttons, a microphone, cameras, a touch-based input device integrated with display device 114 (i.e., a touch screen), and other devices for providing input to and/or output from the vehicle control system 102.

In various embodiments, the storage 208 includes non-volatile memory such as optical drives, magnetic drives, flash drives, or other storage. The global navigation satellite system (GNSS) receiver 220 determines global position of the vehicle control system 102. In various embodiments, the vehicle control software 212 accesses global positioning information from the GNSS receiver 220 in order to determine a current location of the vehicle.

In some embodiments, the CPU 202 is the master processor of the vehicle control system 102, controlling and coordinating operation of other system components. In particular, the CPU 202 receives input and/or transmits output via I/O devices 218 and executes the stiffness manager 214 to modify the stiffness of one or more portions of the vehicle component 216. The CPU 202 may also execute the vehicle control software 212 to implement functions of other devices of a vehicle, such as displaying infotainment-oriented information and vehicle control information on the display 210. For example, and without limitation, when the vehicle control system 102 is in a navigation mode, the display 210 may display maps and other navigation-related information. When the vehicle control system 102 is in a music playback mode, the display 210 may display a song and other music-related information. When the vehicle control system 102 is in a communications mode, the display 210 may display a time duration of a phone call and other call-related information. When the vehicle control system 102 is in a cruise control mode, the display 210 may display a speed of the car and other vehicle information. In various embodiments, any of the above information may be scrolled through and/or selected based on receiving user input, such as touch input on the vehicle component 216.

In some embodiments, one or more portions of the vehicle component 216 that have a particular stiffness correspond to one or more types of input that the vehicle component 216 is configured to receive. For example, and without limitation, a circular area of the vehicle component 216 that has a particular stiffness different than other areas may correspond to a configuration for rotary touch input. In response to receiving the rotary touch input, the vehicle control software 212 may increase or decrease a parameter (e.g., music volume). Additionally, long and narrow areas on the vehicle component 216 having a particular stiffness may receive touch input that corresponds to scrolling information up/down or left/right on the display 210 or moving elements up/down or left/right on the display 210. Furthermore, when the stiffness of the vehicle component 216 is modified from a first stiffness associated with a first mode to a second stiffness associated with a second mode, the stiffness of one or more portions of the vehicle component 216 may be modified and one or more portions of the vehicle component 216 may create the same stiffness.

In the embodiments described below, the stiffness manager 214 may generate one or more signals to cause the I/O devices 218 to modify the stiffness of one or more portions of a vehicle component 216. Furthermore, a stiffness of the one or more portions of the vehicle component 216 caused by the stiffness manager 214 may correspond to a different mode of the vehicle control system 102. For example, and without limitation, the vehicle control system 102 may be in a navigation mode, a music playback mode, a communication mode, or a cruise control mode, as described above. In some embodiments, a mode may be defined by one or more infotainment-related functions or vehicle control functions that are currently available via user input.

Furthermore, in the embodiments described below, the stiffness manager 214 may modify the stiffness of one or more portions of the vehicle component 216 to correspond to a second mode in response to determining that the mode of the vehicle control system 216 has changed from a first mode to a second mode. The stiffness manager 214 may maintain the stiffness of the one or more portions upon determining that the mode has not changed. Moreover, the mode of the vehicle control system 216 may change in response to user input or in response to detecting an event associated with the vehicle. For example, and without limitation, the mode may change in response to the vehicle control system 216 or the vehicle control software 212 detecting a malfunction, receiving input from a sensor, or determining that a predetermined amount of time has elapsed after the occurrence of an event associated with a vehicle. In various embodiments, user input may be received via the vehicle component 216 and/or any other suitable input device of a vehicle.

Moreover, in the embodiments described below, the stiffness manager 214 may cause the I/O devices 218 to modify the stiffness to a maximum stiffness, a minimum stiffness, and any number of additional levels in between the maximum and minimum stiffness of the one or more portions of the vehicle component 216. In various embodiments, a flexible surface of the vehicle component 216 may be composed of rubber and/or any other suitable material capable of deforming without tearing. Thus, any of the above features may be generally applicable to the stiffness-changing embodiments described below.

Figure 3A:
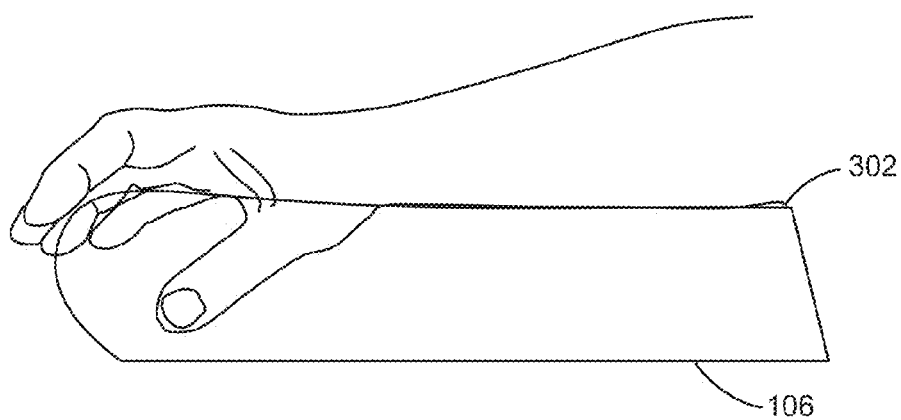
FIGS. 3A, 3B, and 3C illustrate a technique for modifying the stiffness of the armrest of FIG. 1, according to various embodiments.
Figure 3B:
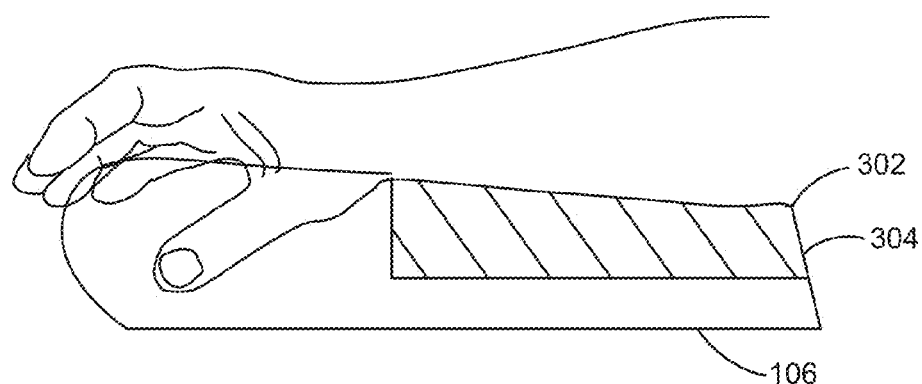
Figure 3C:
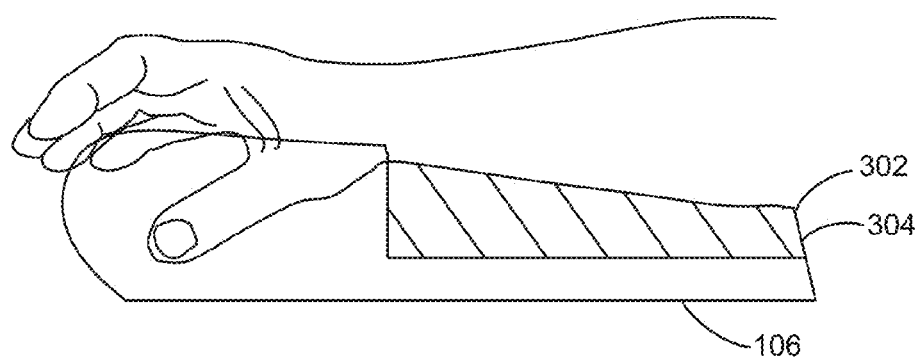

FIGS. 3A, 3B, and 3C illustrate a technique for modifying the stiffness of the armrest 106 of FIG. 1, according to various embodiments. The stiffness manager 214 may modify a stiffness of the armrest 106 by controlling I/O devices 218, such as actuators or springs.

As shown in FIG. 3A, the stiffness manager 214 causes the I/O devices 218 to maintain a high stiffness of the armrest 106 that corresponds to a first mode of the vehicle control system 102. Therefore, when a user's arm exerts force upon the surface 302 of the armrest 106, the surface 302 of the armrest 106 deforms inward by a low amount. Accordingly, the user may determine that the vehicle control system 102 is in the first mode by resting an arm and/or exerting force upon the armrest 106, without having to look away from the road. For example, and without limitation, the first mode may be a navigation mode.

As shown in FIG. 3B, the stiffness manager 214 causes the I/O devices 218 to reduce the stiffness of the armrest 106 to a level that is lower than the stiffness shown in FIG. 3A. The lower stiffness corresponds to a second mode of the vehicle control system 102. Therefore, when a user's arm exerts approximately the same force upon the surface 302 as shown in FIG. 3A, the surface 302 of the armrest 106 deforms inward by a larger amount, and the portion 304 of the armrest 106 becomes compressed by a larger amount (e.g., a volume occupied by the armrest 106 is reduced by a larger amount). Therefore, the user may determine that the vehicle control system 102 has changed to the second mode by resting an arm and/or exerting force upon the armrest 106, causing the armrest 106 to compress. For example, and without limitation, the second mode may be a music playback mode.

In some embodiments, there is a maximum amount by which the portion 304 of the armrest 106 can be compressed. For example, and without limitation, the amount of compression shown in FIG. 3C may be a maximum amount of compression of the armrest 106. In such embodiments, for each possible stiffness of the armrest 106, there is a corresponding threshold force required to compress the portion 304 of the armrest 106 by the maximum amount. Consequently, a force in excess of the threshold force will not cause additional compression of the armrest 106.

As shown in FIG. 3C, the stiffness manager 214 causes the one or more I/O devices 218 to reduce the stiffness of the armrest 106 to a lower stiffness than the stiffness of the armrest 106 of FIG. 3B. The lower stiffness may correspond to a third mode of the vehicle control system 102. Therefore, when a user's arm exerts approximately the same force upon the surface 302 as for FIG. 3B, the surface 302 of the armrest 106 deforms inward by a larger amount, and the portion 304 of the armrest 106 becomes compressed by a larger amount (e.g., a volume occupied by the armrest 106 is reduced by a larger amount). Therefore, the user may determine that the vehicle control system 102 has changed to the third mode by resting an arm and/or exerting force upon the armrest 106 and causing the armrest 106 to compress by a larger amount. For example, and without limitation, the third mode may be a communication mode. Various examples of I/O devices 218 that may be operated by the stiffness manager 214 to modify and/or maintain a stiffness of the armrest 106 or other vehicle component 216 are described below for FIGS. 7-10B.

In the embodiments described below, a vehicle component 216 may include one or more touch-sensitive areas. The vehicle control software 212 may receive touch input from a touch-sensitive area via one or more sensors or other devices associated with the touch-sensitive area. For example, and without limitation, sensors may detect touch input from the touch-sensitive area in response to one or more of a user's fingers touching, pushing, or moving along the touch-sensitive area. Furthermore, the sensors may detect touch input associated with other body parts, such as the user's palm, thumb, and wrist.

Figure 4B:
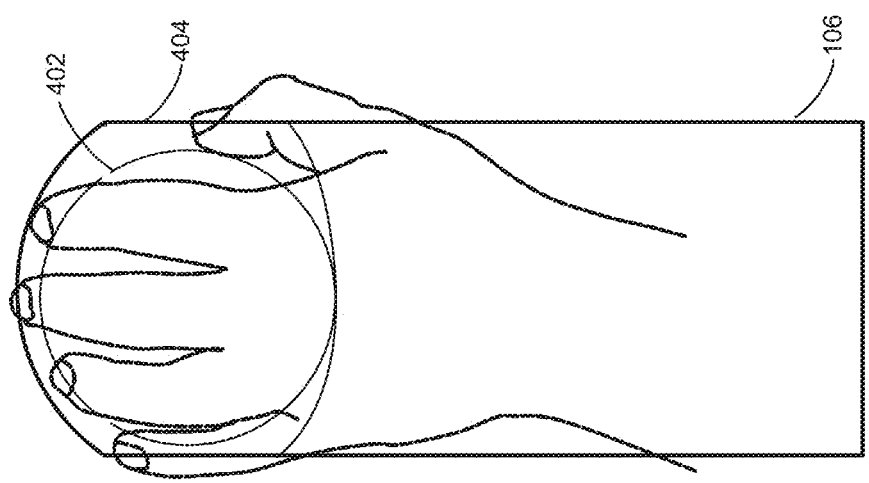
FIGS. 4A and 4B illustrate a technique for modifying the stiffness of a circular area within a touch-sensitive area of the armrest of FIG. 1, according to various embodiments.
Figure 4A:
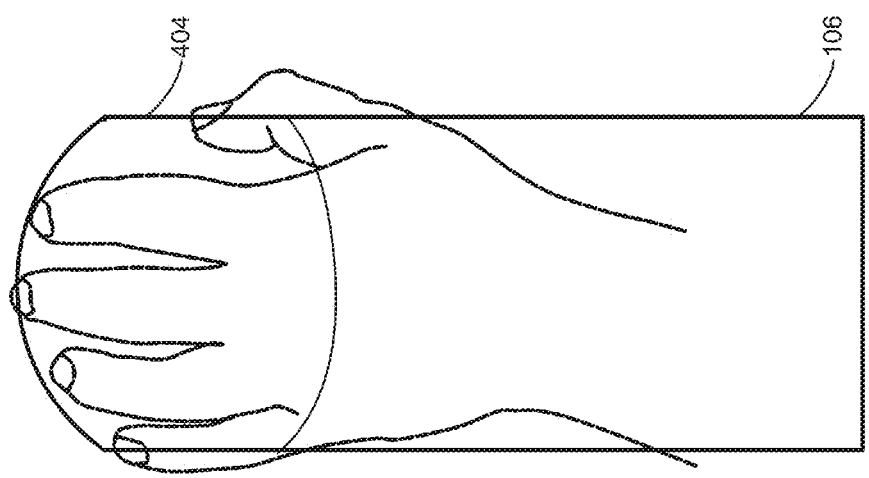

FIGS. 4A and 4B illustrate a technique for modifying the stiffness of a circular area 402 within a touch-sensitive area 404 of the armrest 106 of FIG. 1, according to various embodiments. Both FIGS. 4A and 4B show a top view of the armrest 106. The stiffness manager 214 may modify a stiffness of the circular area 402 by controlling I/O devices 218, such as actuators or springs.

As shown in FIG. 4A, the armrest 106 includes a touch-sensitive area 404. The stiffness manager 214 maintains a first stiffness of the touch-sensitive area 404 that corresponds to a first mode of the vehicle control system 102. In some embodiments, the stiffness of the touch-sensitive area 404 is different than a stiffness of a remainder of the armrest 106. For example, and without limitation, the stiffness of the remainder of the armrest 106 may be any level higher or lower than that of the touch-sensitive area 404. The touch-sensitive area 404 may receive touch input for implementing one or more functions associated with the first mode.

As shown in FIG. 4B, the stiffness manager 214 modifies the stiffness of a circular area 402 within the touch-sensitive area 404 to a second stiffness that is different than the remainder of the touch-sensitive area 404. In some embodiments, the remainder of the touch-sensitive area may be modified to a third stiffness. In some embodiments, the stiffness manager 214 modifies the stiffness of a circular area 402 in response to detecting that the mode of the vehicle control system 102 changes from the first mode to a second mode. The vehicle control software 212 may change the mode to the second mode in response to receiving touch input via the touch-sensitive area 404. Furthermore, in some embodiments, the stiffness manager 214 modifies the stiffness of a circular area 402 even though the mode of the vehicle control system 102 has not changed.

The circular area 402 may be configured to detect, via one or more sensors, circular or rotary touch input. Thus, a user may provide input by moving fingers or other objects in a circular path within the circular area 402 or along a circumference of the circular area 402. In response to receiving the input, the vehicle control software 212 may adjust a parameter such as volume or temperature. In some embodiments, in response to receiving the input, the vehicle control software 212 may scroll through a list of items, such as functions or menu items associated with the current mode. In some embodiments, the speed with which the vehicle control software 212 adjusts a parameter or scrolls through the list of items is proportional to the speed of input along the circular path. In some embodiments, the speed with which the vehicle control software 212 adjusts a parameter or scrolls through the list of items is proportional to or inversely proportional to a radius of the circular path. For example, and without limitation, a user may scroll through a list of items faster by moving fingers in smaller circular paths. In some embodiments, the circular area 402 may correspond to a graphical user element of the display 210, as described below in conjunction with FIG. 12.

Furthermore, in some embodiments, the vehicle control software 212 may receive input when a user presses down onto the circular area 402, as if pressing a button. The vehicle control software 212 may also receive different input signals from different areas within the circular area 402. For example, and without limitation, the vehicle control software 212 may receive a first signal associated with a first type of user input in response to a user pressing down on the left side of the circular area 402 and a second signal associated with a second type of user input in response to the user pressing down on the right side of the circular area 402. In some embodiments, the vehicle control software 212 implements a first function in response to receiving the first signal and implements a second function in response to receiving the second signal.

Figure 5:
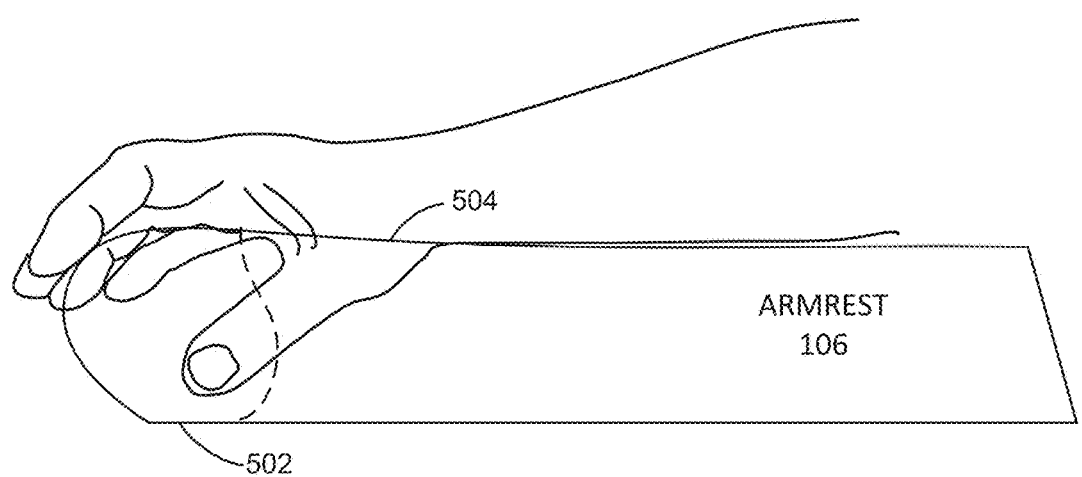
FIG. 5 illustrates a side view of a touch-sensitive area that may be implemented with the armrest of FIG. 1, according to various embodiments.

FIG. 5 illustrates a side view of a touch-sensitive area 502 that may be implemented with the armrest 106 of FIG. 1, according to various embodiments. The stiffness manager 214 may modify a stiffness of the touch-sensitive area 502 and/or the inactive area 504 by controlling I/O devices 218, such as actuators or springs. In the non-limiting example embodiment, the inactive area 504 provides ergonomic support for an arm and/or wrist and does not receive input from the user. In some embodiments, the touch-sensitive area 502 could be extended to include the region associated with the inactive area 504 shown in FIG. 5.

In the non-limiting example embodiment, the stiffness manager 214 modifies the stiffness of the touch-sensitive area 502 and/or the inactive area 504 in response to detecting that the mode of the vehicle control system 102 changes from a first mode to a second mode. Thus, a driver may determine that the mode has changed to the second mode without looking away from the road. In some embodiments, the stiffness manager 214 modifies the stiffness of one or more portions of the touch-sensitive area 502 to correspond to a type of input or input gestures that the touch-sensitive area 502 is configured to receive. For example, and without limitation, the stiffness manager 214 may modify the stiffness of the touch-sensitive area 502 in one or more circular areas as described for FIG. 4B or one or more long and narrow areas as described in FIG. 11.

Figure 6:
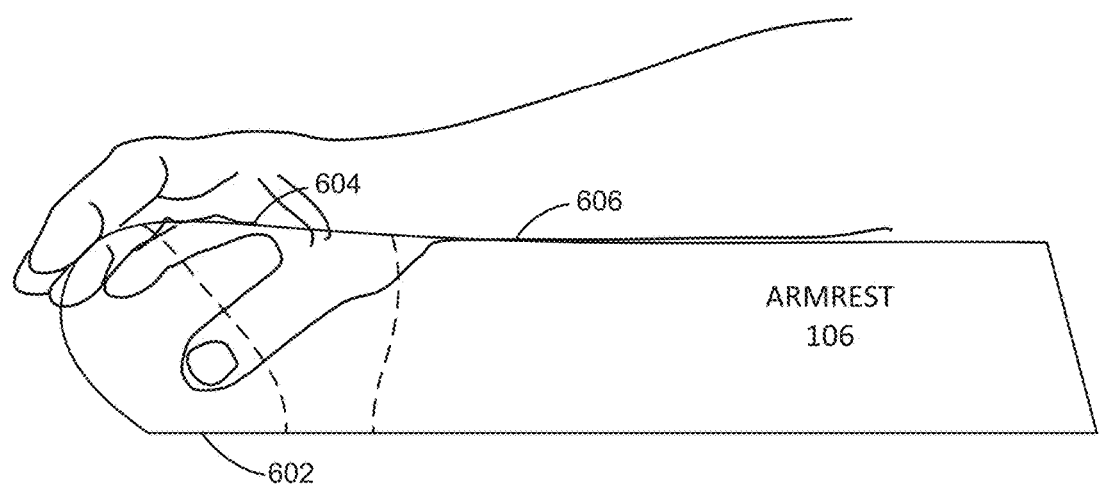
FIG. 6 illustrates a side view of multiple touch-sensitive areas that may be implemented with the armrest of FIG. 1, according to various embodiments.

FIG. 6 illustrates a side view of multiple touch-sensitive areas that may be implemented with the armrest 106 of FIG. 1, according to various embodiments. The stiffness manager 214 may modify a stiffness of the finger touch-sensitive area 602, the palm touch-sensitive area 604, and/or an inactive area 606 by controlling I/O devices 218, such as actuators or springs. In the example embodiment, the inactive area 606 provides ergonomic support of an arm and/or wrist and does not receive input from the user. In some embodiments, the touch-sensitive area 604 could be extended to include the region associated with the inactive area 606 shown in FIG. 5.

In various embodiments, the stiffness manager 214 modifies the stiffness of the finger touch-sensitive area 602, the palm touch-sensitive area 604, and/or an inactive area 606 in response to detecting that the mode of the vehicle control system 102 changes from a first mode to a second mode. Thus, a driver may determine that the mode has changed to the second mode without looking away from the road. In some embodiments, the stiffness manager 214 modifies the stiffness of one or more portions of the finger touch-sensitive area 602 and/or the palm touch-sensitive area 604 to correspond to a type of input or input gestures that the finger touch-sensitive area 602 and/or the palm touch-sensitive area 604 is configured to receive. For example, and without limitation, the stiffness manager 214 may modify the stiffness of the finger touch-sensitive area 602 and/or the palm touch-sensitive area 604 in one or more circular areas as described for FIG. 4B or one or more long and narrow areas as described in FIG. 11.

Figure 7:
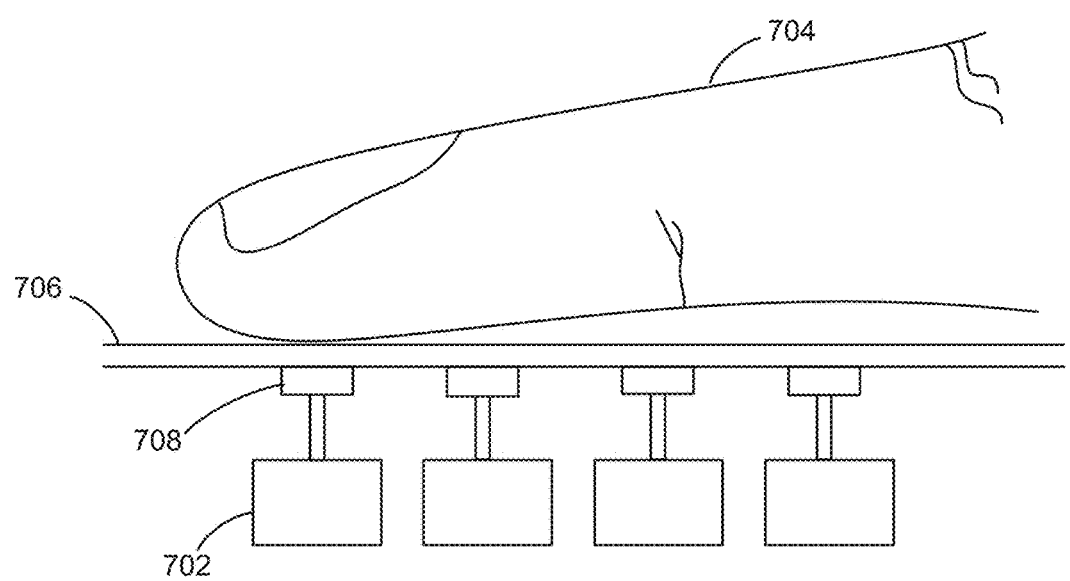
FIG. 7 illustrates a technique for modifying the stiffness of a portion of the armrest of FIG. 1 via actuators, according to various embodiments.

FIG. 7 illustrates a technique for modifying the stiffness of a portion of the armrest 106 of FIG. 1 via actuators, according to various embodiments. One or more actuators 702 may be configured to receive output signals generated via the stiffness manager 214 in order to activate the one or more actuators 702. In the non-limiting example embodiment, a user's finger 704 is exerting force upon the surface 706 of the armrest 106. The finger 704 may be in contact with a touch-sensitive area, such as the finger touch-sensitive area 502. As shown, an actuator 702 includes a moveable portion 708.

As shown, the stiffness manager 214 maintains a high stiffness of the armrest 106 by causing the moveable portion 708 to exert a high amount of force upon the surface 706 from below and/or to exert a high amount of resistance to movement in response to user input. The high stiffness may correspond to a first mode of the vehicle control system 102. When the finger 704 exerts force upon the surface 706, the surface 706 exhibits a low amount of deformation inward and the armrest 106 becomes compressed by a low amount. Therefore, the user may determine that the vehicle control system 102 is in the first mode by using a finger to exert force upon the armrest 106, without having to look away from the road.

In the non-limiting example embodiment, the stiffness manager 214 may lower the stiffness of the armrest 106 by causing the moveable portion 708 to exert a lower amount of force upon the surface 706 from below and/or to exert a lower amount of resistance to movement in response to user input. The lower stiffness may correspond to a second mode of the vehicle control system 102. When the finger 704 exerts approximately the same force upon the surface 706 as above in the first mode, the surface 706 deforms inward by a larger amount and the armrest 106 becomes compressed by a larger amount (e.g., a volume occupied by the armrest 106 is reduced by a larger amount). Therefore, the user may determine that the vehicle control system 102 is in the second mode by using a finger to exert force upon the armrest 106.

Furthermore, the stiffness manager 214 may reduce the stiffness of the armrest 106 to a lower level by causing the moveable portion 703 to exert a lower amount of force upon the surface 706 from below and/or to exert a lower amount of resistance to movement in response to user input. The lower stiffness may correspond to a third mode of the vehicle control system 102. When the finger 704 exerts approximately the same force upon the surface 706 as above in the first mode or second mode, the surface 706 deforms inward by a larger amount and the armrest 106 becomes compressed by a larger amount (e.g., a volume occupied by the armrest 106 is reduced by a larger amount). Therefore, the user may determine that the vehicle control system 102 is in the third mode by using a finger to exert force upon the armrest 106.

In the non-limiting example embodiment, stiffness of different levels and/or different areas of the armrest 106 may be created by the actuators 702 via the stiffness manager 214, depending on which actuators 702 are activated and how much resistance to movement actuators 702 exert in response to user input. In some embodiments, one or more independent actuators 702 may be located underneath one or more of a user's fingers. Furthermore, actuators 702 that are adjacent to each other may operate via the stiffness manager 214 independently or in combination with each other to modify a stiffness of different areas of the armrest. Moreover, a different touch sensor and touch input signal may be associated with each actuator 702 or with each group of actuators 702.

FIGS. 8A and 8B illustrate a technique for modifying the stiffness of the armrest 106 of FIG. 1 by compressing springs, according to various embodiments. One or more pistons 802 may be configured to receive output signals generated via the stiffness manager 214 in order to activate the one or more pistons 802. Each piston 802 is connected to a spring 804 that is in contact with a surface 806 of the armrest 106. In some embodiments, the surface 806 or a portion of the surface 806 may be a touch-sensitive area, such as the finger touch-sensitive area 602 or the palm touch-sensitive area 604.

As shown in FIG. 8A, the stiffness manager 214 maintains a low stiffness of the armrest 106 by causing springs 804 to exert a low amount of force upon the surface 806 from below and/or to exert a low amount of resistance to movement in response to user input. The low stiffness may correspond to a first mode of the vehicle control system 102. When a user exerts force upon the surface 806, the surface 806 deforms inward by a large amount and the armrest 106 becomes compressed by a large amount. Therefore, the user may determine that the vehicle control system 102 is in the first mode by exerting force upon the armrest 106, without having to look away from the road.

As shown in FIG. 8B, the stiffness manager 214 may raise the stiffness of the armrest 106 to a higher level by causing the moveable portion 808 to extend up, compressing the springs 804. The compressed springs 804 exert a higher amount of force upon the surface 806 from below and/or exhibit a higher amount of resistance to movement in response to user input. The higher stiffness may correspond to a second mode of the vehicle control system 102. When the user exerts approximately the same force upon the surface 806 as above in the first mode, the surface 806 deforms inward by a smaller amount and the armrest 106 becomes compressed by a smaller amount (e.g., a volume occupied by the armrest 106 is reduced by a smaller amount). Thus, the user may determine that the vehicle control system 102 is in the second mode by exerting force upon the armrest 106.

Furthermore, the stiffness manager 214 may raise the stiffness of the armrest 106 to a higher level by causing the moveable portion 808 to extend up by an additional amount, compressing the springs 804 by an additional amount. Thus, the compressed springs 804 exert more force upon the surface 806 and exhibit a higher amount of resistance to movement in response to user input. The higher stiffness may correspond to a third mode of the vehicle control system 102. When a user exerts approximately the same force upon the surface 806 as above in the first mode or second mode, the surface 806 deforms inward by a smaller amount and the armrest 106 becomes compressed by a smaller amount (e.g., a volume occupied by the armrest 106 is reduced by a smaller amount).

Figure 9A:
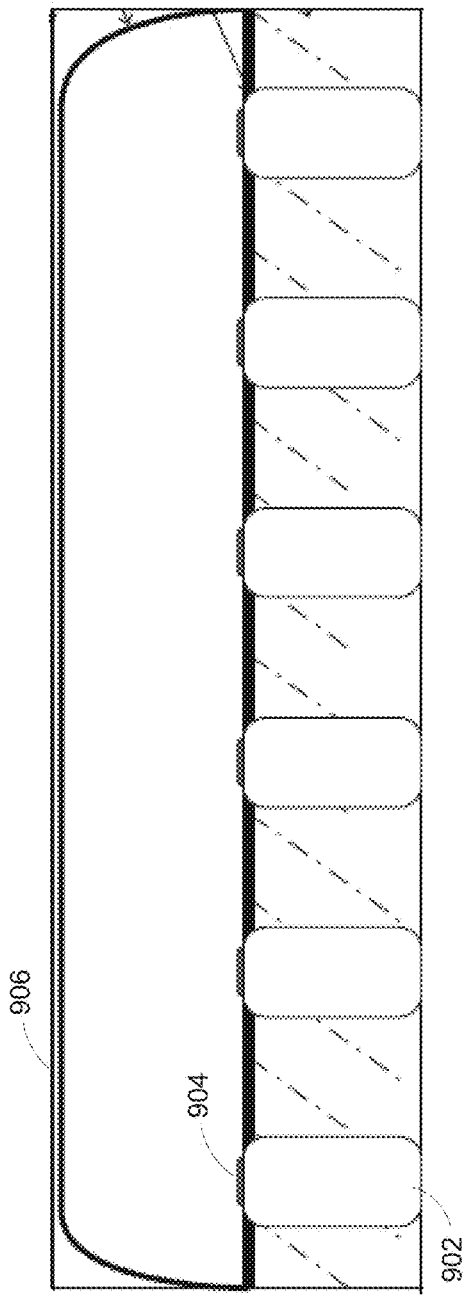
FIGS. 9A and 9B illustrate a technique for modifying the stiffness of the armrest of FIG. 1 by applying pistons to a surface, according to various embodiments.
Figure 9B:
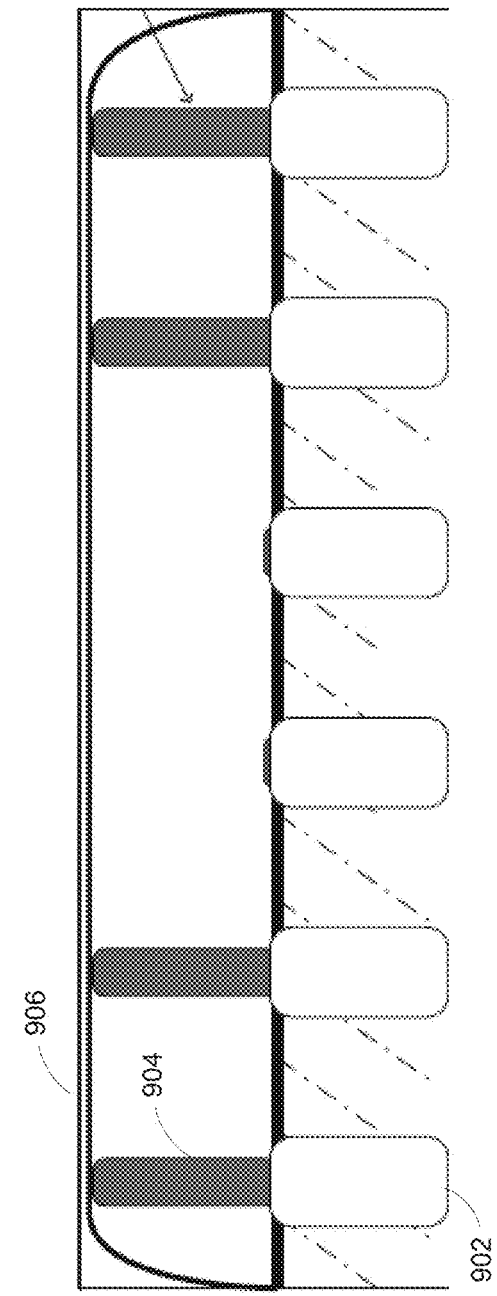

FIGS. 9A and 9B illustrate a technique for modifying the stiffness of the armrest 106 of FIG. 1 by applying pistons to a surface, according to various embodiments. One or more pistons 902 may be configured to receive output signals generated via the stiffness manager 214 in order to activate the one or more pistons 902 by extending a moveable portion 904 upward. In some embodiments, a force is applied to the underside of the moveable portion 904 via a leaf, cantilever, spring, or other mechanism in order to extend the moveable portion 904 upward to contact the underside of a surface 906 of the armrest 106. In some embodiments, the surface 906 or a portion of the surface 906 may be a touch-sensitive area, such as the finger touch-sensitive area 602 or the palm touch-sensitive area 604.

As shown in FIG. 9A, the stiffness manager 214 maintains a low stiffness of the armrest 106 by causing the moveable portion 904 to remain retracted. Thus, the moveable portion 904 is not applied to the surface 906. The low stiffness may correspond to a first mode of the vehicle control system 102. When a user exerts force upon the surface 906, the surface 906 deforms inward by a large amount and the armrest 106 becomes compressed by a large amount. Therefore, the user may determine that the vehicle control system 102 is in the first mode by exerting force upon the armrest 106, without having to look away from the road.

As shown in FIG. 9B, the stiffness manager 214 may raise the stiffness of the armrest 106 to a higher level by causing the moveable portion 904 to extend up to contact the surface 906. The moveable portion 904 exerts an amount of force upon the surface 906 from below and/or exerts an amount of resistance to movement in response to user input. The higher stiffness may correspond to a second mode of the vehicle control system 102. When the user exerts approximately the same force upon the surface 906 as above in the first mode, the surface 906 deforms inward by a smaller amount and the armrest 106 becomes compressed by a smaller amount (e.g., a volume occupied by the armrest 106 is reduced by a smaller amount). Therefore, the user may determine that the vehicle control system 102 is in the second mode by exerting force upon the armrest 106.

Furthermore, the stiffness manager 214 may raise the stiffness of the armrest 106 to a higher level by applying a higher amount of force to the underside of the moveable portion, causing the moveable portion 904 to exert more force upon the surface 906 and/or to exert a higher amount of resistance to movement in response to user input. The higher stiffness may correspond to a third mode of the vehicle control system 102. When a user exerts approximately the same force upon the surface 906 as above in the first mode or second mode, the surface 906 deforms inward by a smaller amount and the armrest 106 becomes compressed by a smaller amount (e.g., a volume occupied by the armrest 106 is reduced by a smaller amount).

In some embodiments, one or more of the moveable portions 904 remains retracted. For example, and without limitation, as shown in FIG. 9B, the middle two moveable portions 904 remain retracted while the remaining moveable portions 904 are extended to the surface 906. In some embodiments, a portion of the armrest 106 above the retracted moveable portions 904 has a lower stiffness than the remaining portions of the armrest 106. In some embodiments, the lower stiffness of the portion of the armrest 106 corresponds to a fourth mode of the vehicle control system 102. In other embodiments, the lower stiffness of the portion of the armrest 106 provides an indication of an acceptable type of input.

FIGS. 10A and 10B illustrate a technique for modifying the stiffness of the armrest 106 of FIG. 1 via electromagnets, according to various embodiments. One or more magnets 1002 may be connected to the underside of a surface 1004 with one or more electromagnets 1006 located below the magnets 1002. The electromagnets 1006 are configured to receive output signals generated via the stiffness manager 214 in order to activate the electromagnets 1006 to generate a magnetic field. In some embodiments, the surface 1004 or a portion of the surface 1004 may be a touch-sensitive area, such as the finger touch-sensitive area 602 or the palm touch-sensitive area 604.

As shown in FIG. 10A, the stiffness manager 214 maintains a low stiffness of the armrest 106 by causing the electromagnets 1006 to generate a magnetic field of a low strength. The low strength of the magnetic field creates a low repulsion force between the magnets 1002 and the electromagnets 1006. The magnetic field causes the magnets 1002 to exert a low force upon the surface 1004 from below and/or to exert a low amount of resistance to movement in response to user input. The low stiffness may correspond to a first mode of the vehicle control system 102. When a user exerts force upon the surface 1004, the surface 1004 deforms inward by a large amount and the armrest 106 becomes compressed by a large amount. Therefore, the user may determine that the vehicle control system 102 is in the first mode by exerting force upon the armrest 106, without having to look away from the road.

As shown in FIG. 10B, the stiffness manager 214 may raise the stiffness of the armrest 106 to a higher level by causing the electromagnets 1006 to generate a stronger magnetic field. The stronger magnetic field creates a higher repulsion force between the magnets 1002 and the electromagnets 1006. The stronger magnetic field causes the magnets 1002 to exert a stronger force upon the surface 1004 from below and/or to exert a low amount of resistance to movement in response to user input. The higher stiffness may correspond to a second mode of the vehicle control system 102. When a user exerts force upon the surface 1004, the surface 1004 deforms inward by a smaller amount and the armrest 106 becomes compressed by a lower amount. Therefore, the user may determine that the vehicle control system 102 is in the second mode by exerting force upon the armrest 106 and noticing that the stiffness is at a higher level.

Moreover, the stiffness manager 214 may modify the stiffness of the armrest 106 to one or more higher levels by causing the electromagnets 1006 to generate stronger magnetic fields, as described above. In various embodiments, the higher stiffness may correspond to additional modes of the vehicle control system 102. Furthermore, in other embodiments, the magnets 1002 may be electromagnets and the stiffness manager 214 causes the magnets 1002 to generate stronger magnetic fields in a manner as described above for the electromagnets 1006.

In some embodiments, the stiffness manager 214 may control a pneumatic system to modify the stiffness of the armrest 106 or other vehicle component 216. For example, and without limitation, the stiffness manager 214 may cause I/O devices 218 to increase the air pressure beneath the surface of the vehicle component 216 by a particular amount to increase the stiffness of the vehicle component 216. Conversely, the stiffness manager 214 may cause I/O devices 218 to decrease the air pressure beneath the surface of the vehicle component 216 by a particular amount to decrease the stiffness of the vehicle component 216.

In another embodiment, the stiffness manager 214 may control a particle jamming system in a similar way to the pneumatic system to modify the stiffness of the armrest 106 or other vehicle component 216. The particle jamming system includes a granular medium, such as sand. The stiffness of the vehicle component 216 may be raised by lowering air pressure or creating a vacuum within the vehicle component. Conversely, the stiffness may be lowered by increasing air pressure to allow particles to move more freely within the vehicle component 216. Accordingly, by controlling the air pressure, the stiffness manager 214 may modify the stiffness of the vehicle component 216.

Further, in some embodiments, the stiffness manager 214 may control shape change materials to modify the stiffness of the armrest 106 or other vehicle component 216. For example, and without limitation, the stiffness manager 214 may use shape change material instead of the pistons of FIGS. 8A, 8B, 9A, and 9B. Thus, the stiffness manager 214 may cause the shape change material to exert an amount of force upon a surface of the vehicle component 216 from below and/or exert an amount of resistance to movement in response to user input.

FIG. 11 illustrates a top view of portions of the armrest 106 of FIG. 1 that correspond to slider elements of a graphical user interface (GUI) 1102, according to various embodiments. As shown in FIG. 11, the stiffness manager 214 modifies the stiffness of a first portion 1104 and a second portion 1106 of the armrest 106 to a stiffness that is different from the stiffness of the surrounding portions of the armrest 106. For example, and without limitation, the stiffness of the remainder of the armrest 106 may be any level higher or lower than that of the first portion 1104 and the second portion 1106. The stiffness of the first portion 1104 and the second portion 1106 may be modified by controlling I/O devices, as described above, or via any other suitable technique. Although the first portion 1104 and the second portion 1106 are shown as long and narrow bands, any other suitable size or shape may be implemented.

In the non-limiting example embodiment, the first portion 1104 and the second portion 1106 may be considered action areas or action channels that correspond to elements of the GUI 1102. For example, and without limitation, the first portion 1104 may correspond to a first element 1108 and the second portion 1106 may correspond to a second element 1110. Thus, the vehicle control software 212 may cause the first element 1108 to move up on the GUI 1102 in response to touch input on to the first portion 1104. In some embodiments, the first element 1108 moves up in the GUI 1102 in response to touch input upward or away from a user along the first portion 1104.

Similarly, the second element 1110 may move up the GUI 1102 in response to touch input upward or away from a user along the second portion 1106. The location of the first element 1108 and the second element 1110 may correspond to a value of a first parameter and a value of a second parameter, respectively. For example, and without limitation, the first element 1108 may correspond to a treble value and the second element 1110 may correspond to a bass value for a stereo system. In such embodiments, as the first element 1108 moves, the treble value is modified, and as the second element 1110 moves, the bass value is modified. In this way, movement of elements of the GUI 1102 may correspond to user input received via the armrest 106.

In some embodiments, any other number of portions of the armrest 106 may change in stiffness and may correspond to GUI elements, as described above. Furthermore, in various embodiments, the portions of the armrest 106 may be oriented in directions other than the orientations of the first portion 1104 and the second portion 1106. For example, and without limitation, one or more bands of a particular stiffness may be perpendicular to the first portion 1104 or oriented at any other suitable angle. Moreover, in some embodiments, a particular arrangement of the bands of stiffness may correspond to a particular mode of the vehicle control system 102.

FIG. 12 illustrates a top view of a portion of the armrest of FIG. 1 that corresponds to a menu 1202 of a graphical user interface 1204 and a circular element 1206 of the graphical user interface 1204, according to various embodiments. As shown in FIG. 12, the stiffness manager 214 modifies the stiffness of a circular area 1208 of the armrest 106 to a stiffness that is different from the stiffness of the surrounding portions of the armrest 106. For example, and without limitation, the stiffness of the remainder of the armrest 106 may be any level higher or lower than that of the circular area 1208. The stiffness of the circular area 1208 and the remainder of the armrest 106 may be modified by controlling I/O devices as described above or any other suitable technique. In some embodiments, the circular area 1208 may be an ellipse, oval, or any other suitable shape and/or size. Moreover, in some embodiments, the circular area 1208 may function in the same or similar manner as described above for circular area 402 of FIG. 4.

In the non-limiting example embodiment, the circular area 1208 may be considered an action area that corresponds to elements of the GUI 1204. For example, and without limitation, the circular area 1208 may correspond to a hierarchy of a menu of the vehicle control system 102, such as the menu 1202 of the GUI 1204. In the non-limiting example embodiment, the stiffness manager 214 may modify the stiffness of the circular area 1208 to become higher or lower in response to navigation to a lower (e.g., deeper) level within the menu 1202. For example, and without limitation, the stiffness manager 214 may increase the stiffness of the circular area 1208 from a first level associated with the top level 1202-1 (e.g., root level) of the menu 1202 to a second level associated with the middle level 1202-2 of the menu 1202 in response to navigation from the top level 1202-1 to the middle level 1202-2. Thus, by applying pressure to the circular area 1208, a user may determine that the middle level 1202-2 of the menu 1202 is currently selected. Further, the stiffness manager 214 may increase the stiffness of the circular area 1208 from the second level to a third level associated with the bottom level 1202-3 of the menu 1202 in response to navigation from the middle level 1202-2 to the bottom level 1202-3. Thus, by applying pressure to the circular area 1208, a user may determine that the bottom level 1202-3 of the menu 1202 is currently selected. In some embodiments, the circular area 1208 may correspond to a hierarchy of a menu of the vehicle control system 102, where the menu is not visible on the GUI 1204.

In various embodiments, a user may navigate to any other number of levels of the menu 1202 hierarchy, where the stiffness manager 214 increases or decreases the stiffness of the circular area 1208 in response to navigation from one level to another level. Therefore, by applying pressure to the circular area 1208, a user may determine how deep they are in the menu 1202 and how many levels the currently selected level is from the top or root level 1202-1. Moreover, in some embodiments, other shapes and other portions of the armrest 106 function in the manner described above for the circular area 1208. Thus, any suitable areas of the armrest 106 may be used to indicate a current level of the menu hierarchy to which the user has navigated. Further, the vehicle control software 212 may allow a user to navigate up or down the hierarchy of the menu 1202 in response to user input via the circular area 1208 or another portion of the armrest 106 or in response to any other suitable input for navigating the menu 1202.

In some embodiments, the circular area 1208 may be an action area that corresponds to one or more elements of the GUI 1204. For example, and without limitation, the circular area 1208 may correspond to circular element 1206 of the graphical user interface 1204. Thus, the vehicle control software 212 may cause circular element 1206 or portions of the circular element 1206 to rotate in a clockwise or counterclockwise direction in response to a respective clockwise or counterclockwise touch input within the circular area 1208. In some embodiments, the circular element 1206 may correspond to a parameter value. For example, and without limitation, movement of the circular element 1206 or portions of the circular element 1206 in a clockwise direction may correspond to an increase in volume of an audio system and movement in the counterclockwise direction may correspond to a decrease in volume.

Moreover, in some embodiments, the stiffness manager 214 may modify the stiffness by pulsing or varying stiffness of the vehicle component 216 in a repeating pattern over time. The repeating pattern may correspond to a mode of the vehicle control system 102. Moreover, the rate at which the pattern repeats may indicate a level of the menu 1202. A first rate may indicate a first menu level and a faster or slower rate may indicate a second menu level. In some embodiments, a repeating pattern of stiffness may indicate acceptance of, or rejection of, user input. For example, and without limitation, if only left and right swipes are an acceptable form of input for a particular mode, then in response to a down swipe or up swipe, the stiffness manager 214 may cause the vehicle component 216 to stiffen and soften two or more times in succession to indicate rejection of the input.

Further, a first wave pattern of stiffness moving across the vehicle component 216 may correspond to a first mode and a second wave pattern may correspond to a second mode. For example, and without limitation, a wave moving from the front to back may correspond to a first mode, a wave moving from back to front may correspond to a second mode, and a wave moving from left to right or right to left may correspond to a third mode.

Figure 13:
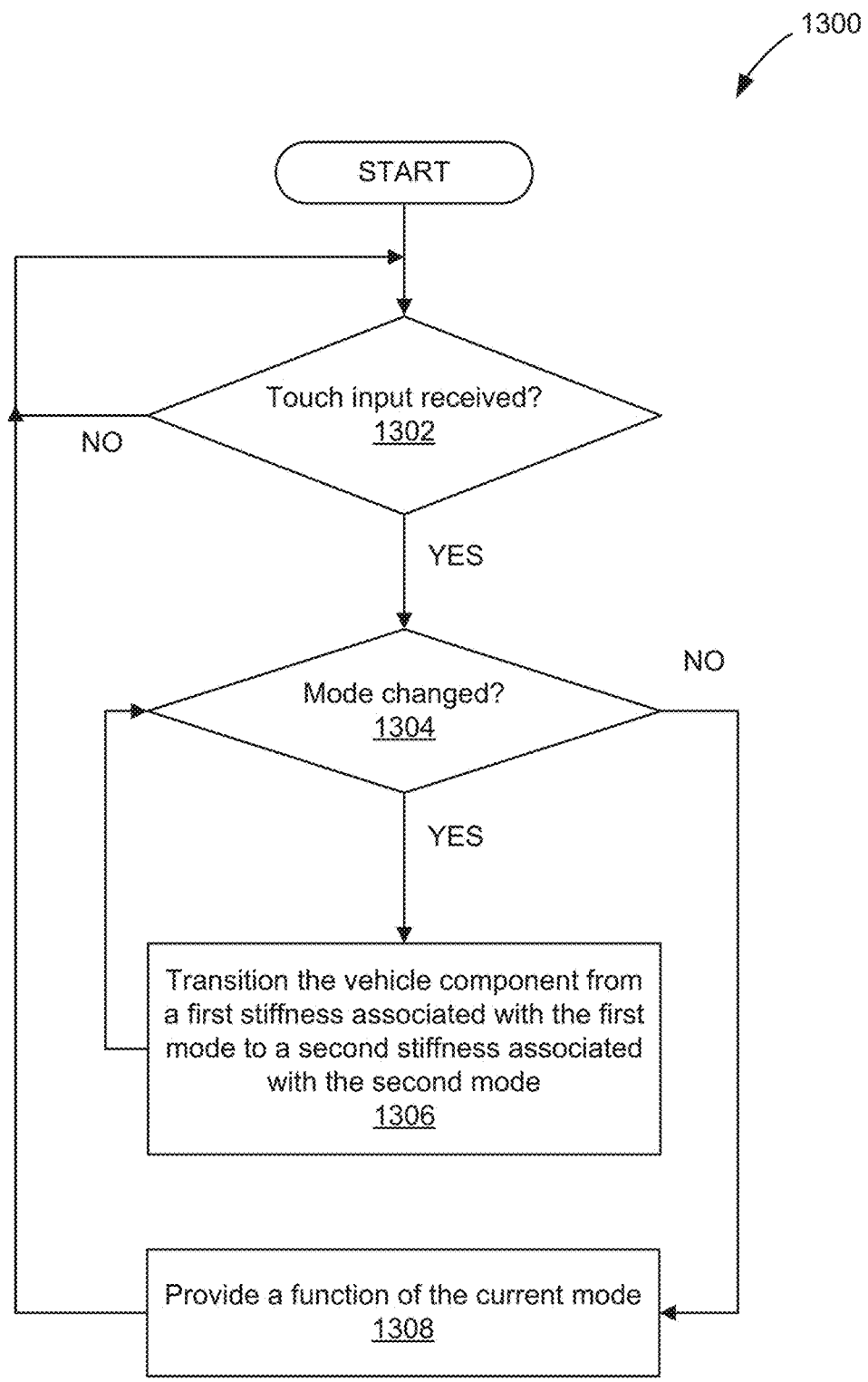
FIG. 13 is a flow diagram of method steps for modifying the stiffness of an armrest in response to a change in a mode of a vehicle control system, according to various embodiments.

FIG. 13 is a flow diagram of method steps for modifying the stiffness of a vehicle component 216 in response to a change in a mode of a vehicle control system 102, according to various embodiments. Although the method steps are described in conjunction with the systems of FIGS. 1-12, persons skilled in the art will understand that any system configured to perform the method steps, in any order, falls within the scope of the various embodiments.

As shown, a method 1300 begins at step 1302, where the vehicle control software 212 determines whether touch input has been received. If the vehicle control software 212 determines that touch input has not been received, the method 1300 returns to step 1302. If the vehicle control software 212 determines that touch input has been received, the method 1300 proceeds to step 1304, where the vehicle control software 212 determines whether the mode of the vehicle control system 102 has changed from a first mode to a second mode in response to receiving the touch input.

In some embodiments, the vehicle control software 212 determines whether the mode of the vehicle control system 102 has changed from the first mode to the second mode regardless of whether any touch input is received. Thus, the mode of the vehicle control system 102 may change without receiving touch input. For example, and without limitation, the mode may change in response to occurrence of an event associated with a vehicle or in response to determining that a predetermined amount of time has elapsed after the occurrence of an event associated with a vehicle.

At step 1304, if the vehicle control software 212 determines that the mode of the vehicle control system 102 changed from the first mode to the second mode, then the method 1300 proceeds to step 1306, where the stiffness manager 214 modifies the stiffness of the vehicle component 216 from a first stiffness associated with the first mode to a second stiffness associated with the second mode. For example, and without limitation, a signal may be generated via the stiffness manager 214 that causes stiffness-changing devices, such as actuators or springs, to modify the stiffness of the vehicle component 216. The method 1300 then returns to step 1304. At 1304, if the vehicle control software 212 determines that the mode of the vehicle control system 102 has not changed, then at step 1308, the vehicle control software 212 provides a function associated with the current mode in response to the touch input. The method 1300 then returns to step 1302.

Figure 14:
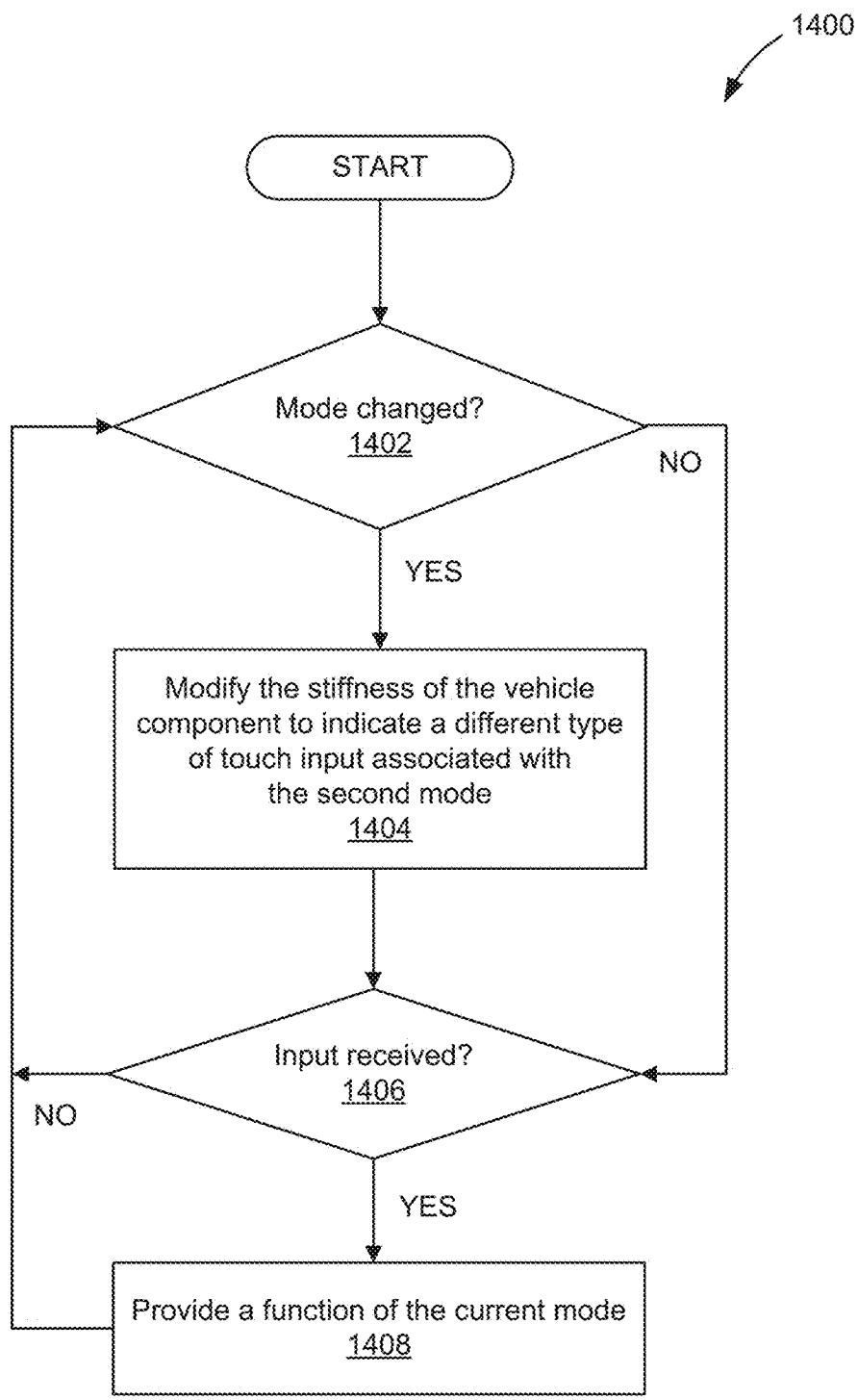
FIG. 14 is a flow diagram of method steps for modifying the stiffness of an armrest to indicate which types of input gestures are available, according to various embodiments.

FIG. 14 is a flow diagram of method steps for modifying the stiffness of a vehicle component 216 to indicate which types of touch input are available, according to various embodiments. Although the method steps are described in conjunction with the systems of FIGS. 1-12, persons skilled in the art will understand that any system configured to perform the method steps, in any order, falls within the scope of the various embodiments.

As shown, a method 1400 begins at step 1402, where the vehicle control software 212 determines whether the mode of the vehicle control system 102 has changed from a first mode to a second mode. If the vehicle control software 212 determines that the mode has not changed, then the method 1400 proceeds to step 1406, where the method 1400 determines whether touch input has been received. If the vehicle control software 212 determines that the mode has changed to the second mode, then the method 1400 proceeds to step 1404, where the stiffness manager 214 modifies the stiffness of the vehicle component 216 to indicate a different type of touch input is available with the second mode than was available with the first mode. For example, and without limitation, the stiffness manager 214 may change the stiffness of the vehicle component 216 from a circular area 1208 associated with the first mode to a first portion 1104 associated with the second mode that indicates strokes along the first portion 1104 are available for touch input.

At step 1406, the vehicle control software 212 determines whether touch input has been received. For example, and without limitation, the vehicle control software 212 may determine whether touch input has been received along the first portion 1104. If the vehicle control software 212 determines that touch input has not been received, then the method 1400 returns to step 1402. At step 1406, if the vehicle control software 212 determines that touch input has been received, then the method 1400 proceeds to step 1408. At step 1408, the vehicle control software 212 provides a function associated with the current mode. For example, and without limitation, the vehicle control software 212 may increase a treble value of an audio system, as described for FIG. 11. In some embodiments, the touch input may also cause a GUI element to mirror the touch input, as described for FIG. 11. The method 1400 then returns to step 1402.

In sum, the vehicle control software determines that a mode of a vehicle control system has changed from a first mode to a second mode. In response, the stiffness manager causes a surface stiffness associated with the vehicle control system to change from a first surface stiffness associated with the first mode to a second surface stiffness associated with the second mode. The second surface stiffness of one or more portions of the surface may have a different surface stiffness than in the first mode. The one or more portions of the surface may be configured to accept touch input to implement functions associated with the second mode. Additionally, the surface stiffness of one or more portions of the surface may indicate which type(s) of input gesture are available for that portion.

At least one advantage of the techniques described herein is that a user is able to operate a vehicle control system of a vehicle without looking at a user interface, such as a screen. For instance, the user is able to determine a current mode of a vehicle control system by pressing and/or squeezing an armrest, knob, steering wheel, or other device. Based on the surface stiffness of one or more portions of the armrest, knob, steering wheel, or other device, the user may determine what type of input the device is configured to receive. Accordingly, the user is able to more effectively pay attention to driving conditions while safely and efficiently operating the vehicle control system.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for modifying the stiffness of a vehicle component, the system comprising:
   one or more devices coupled to the vehicle component, wherein the vehicle component is included in a control system located within a passenger compartment of a vehicle;
   a processor coupled to the one or more devices, the processor configured to:
      determine that a software application has switched from a first mode to a second mode; and
      cause the one or more devices to modify a stiffness of the vehicle component comprising modifying the stiffness from a first stiffness associated with the first mode to a second stiffness associated with the second mode while retaining a shape of the vehicle component, wherein, when a force is exerted upon the vehicle component, the vehicle component deforms by a different amount under the first stiffness than under the second stiffness.

2. The system of claim 1, wherein the second stiffness indicates an available type of touch input.

3. The system of claim 2, wherein the touch input causes movement of a graphical user interface (GUI) element.

4. The system of claim 1, wherein the first mode corresponds to a first level of a menu hierarchy and the second mode corresponds to a second level of the menu hierarchy.

5. The system of claim 1, wherein the one or more devices comprise at least one of an actuator, a piston, a spring, and an electromagnet coupled to a surface of the vehicle component.

6. The system of claim 5, wherein the one or more devices modify the stiffness of the vehicle component by changing a resistance to movement of a surface of the vehicle component based on touch input.

7. The system of claim 1, wherein the vehicle component comprises an area having the second stiffness, wherein the area is configured to receive touch input for modifying a GUI element.

8. The system of claim 1, wherein the vehicle component comprises an armrest, a knob, or a steering wheel.

9. The system of claim 1, wherein modifying the stiffness further comprises alternating the vehicle component between the first stiffness and the second stiffness in a repeating pattern, wherein the repeating pattern is associated with the second mode.

10. A method for modifying the stiffness of a surface of a vehicle component, the method comprising:
    determining that a software application has switched from a first mode to a second mode; and
    causing, via a processor, one or more devices to modify a stiffness of the vehicle component from a first stiffness associated with the first mode to a second stiffness associated with the second mode, wherein, when a force is exerted upon the vehicle component, the vehicle component deforms by a different amount under the first stiffness than under the second stiffness while retaining a shape of the vehicle component;
    wherein the vehicle component is included in a control system located within a passenger compartment of a vehicle.

11. The method of claim 10, wherein the second stiffness is higher than the first stiffness, and a function associated with a graphical user interface (GUI) is selected in response to touch input on the surface.

12. The method of claim 10, wherein the second stiffness indicates an available type of touch input associated with the second mode.

13. The method of claim 10, wherein the surface is coupled to one or more particle jammers configured to modify the stiffness of the vehicle component from the first stiffness to the second stiffness.

14. The method of claim 12, wherein the touch input causes movement of a GUI element.

15. The method of claim 10, wherein the first mode corresponds to a first level of a menu hierarchy associated with the software application and the second mode corresponds to a second level of the menu hierarchy associated with the software application.

16. The method of claim 10, wherein the vehicle component comprises an elongated area having the second stiffness, wherein the elongated area is configured to receive touch input associated with modifying a GUI element.

17. The method of claim 16, wherein modifying the GUI element comprises scrolling the GUI element in response to the touch input.

18. The method of claim 16, further comprising modifying a parameter of the control system in response to the touch input.

19. A non-transitory computer-readable storage medium including instructions that, when executed by a processor, cause the processor to modify a stiffness of a surface of a vehicle component, by performing the steps of:
    receiving a first input selecting a first mode of a software application; and
    causing the surface of the vehicle component to change from a first stiffness to a second stiffness associated with the mode, wherein the surface of the vehicle component is configured to receive touch input, wherein, when a force is exerted upon the surface of the vehicle component, the vehicle component deforms by a different amount under the first stiffness than under the second stiffness while retaining a shape of the surface of the vehicle component;

wherein the surface of the vehicle component is included in a control system located within a passenger compartment of a vehicle.

20. The non-transitory computer-readable storage medium of claim 19, further comprising:

receiving a second input selecting a second mode of the software application; and in response, causing the surface of the vehicle component to change from the second stiffness to the first stiffness.

* * * * *